United States Patent [19]

Haggett

[11] Patent Number: 4,631,383
[45] Date of Patent: Dec. 23, 1986

[54] MACHINE WITH AUTOMATIC FINGER SAFETY GUARD

[75] Inventor: Irving C. Haggett, Canterbury, Conn.

[73] Assignee: Yardney Corporation, Pawcatuck, Conn.

[21] Appl. No.: 780,761

[22] Filed: Sep. 27, 1985

[51] Int. Cl.⁴ .............................................. B23K 11/00
[52] U.S. Cl. ................................ 219/78.01; 219/86.41;
 219/89; 219/91.1; 100/53; 192/134
[58] Field of Search ................... 219/110, 89, 86.41,
 219/86.22, 91.1, 78.1; 100/53; 192/134;
 200/61.41, 61.42

[56] References Cited

U.S. PATENT DOCUMENTS 4,041,272 8/1977 Burton et al. ........................... 219/89
4,060,160 11/1977 Lieber ............................... 200/61.42

FOREIGN PATENT DOCUMENTS 268967 11/1929 Italy ....................................... 100/53

*Primary Examiner*—L. A. Goldberg
*Assistant Examiner*—Lincoln D. Donovan
*Attorney, Agent, or Firm*—Donald E. Nist

[57] ABSTRACT

An improved machine with automatic finger safety guard includes a machine body having a finger-accessible work space and at least one movable machine component disposed in the work space. An electric motor is connected by leads to a power source and is also connected to the movable component for powering the component. An automatic finger safety guard is installed on the machine and preferably includes a hollow tube disposed around the work space and movable between an operative protective position and an inoperative retracted position. Switches are connected to the enclosure and to the electric motor leads for automatically interrupting the powering of said movable component upon movement of the enclosure from the fully protective position to the retracted position. The machine preferably includes a resistance welding machine having a pair of welding electrodes which approach each other in the work space, at least one of which electrodes is movable into and out of the work space.

4 Claims, 3 Drawing Figures

MACHINE WITH AUTOMATIC FINGER SAFETY GUARD

BACKGROUND OF THE INVENTION

1. Field of the Invention

The present invention generally relates to safety devices for machines and more particularly to an improved machine having an automatic finger safety guard connected thereto.

2. Prior Art

Machinery which provides a work space accessible to the worker's fingers is frequently dangerous since a moving component of the machine operating on the work piece in the work space can damage the worker's fingers if they are intentionally or inadvertently inserted into the work space. One such type of machine is a resistance welding machine typically employing a vertically oriented fixed electrode mounted in a work space and a vertically oriented movable electrode spaced above and aligned with the fixed electrode. When the machine is turned on, the movable electrode descends toward the fixed electrode and contacts the work piece in the work space so that the welding operation can be carried out. The worker must be careful when the machine is on to keep his fingers out of the work space, otherwise they can be caught by the approximating electrodes and serious injury or amputation can occur.

Operation of such machinery characteristically causes some apprehension in the worker, reducing the speed with which the welding or other operation can be repeated upon successive work pieces. Many such machines incorporate no safety device at all. However, certain state and/or federal safety code standards now require safety guards and the like on certain of such machines. One conventional form of safety device installed on resistance type welding machines includes a pair of palm button switches which are activated by both hands of the welder in order to cause the movable electrode to approach the fixed electrode in the work space, so that welding can take place. However, since these palm switches effectively minimize the worker's hand activity, usually additional holding fixtures are required to permit proper positioning and manipulation of the work piece before, during and after the welding operation. Such holding fixtures are expensive to fabricate and install and in many cases reduce productivity.

Accordingly, it would be desirable to be able to provide a work machine having a finger accessible work space which could incorporate a finger safety guard which would not require supplemental holding and positioning devices for the work piece, would not reduce productivity and yet would provide ample safety for the worker. Such a guard should be inexpensive, easy to fabricate and install, durable and not subject to breakdown. The guard should not require the use of any additional hand movements of the worker.

SUMMARY OF THE INVENTION

The improved machine of the present invention with its automatic safety guard satisfies all the foregoing needs. The machine is substantially as set forth in the Abstract above. Thus, the machine includes a machine body defining a work space within which a machine component is movable and to which the operator of the machine has finger access. An electric motor powers the movable components and a finger safety guard is installed on the machine body. The guard includes an enclosure disposed around the work space and movable between its protective operative position and a retracted non-protective position. Switch means are connected to the enclosure and to leads connected to the motor so that movement of the enclosure, as by the fingers, from the protective position automatically de-energizes the motor by interrupting the electrical circuit through the leads.

Preferably, the machine is in the form of a resistance welding machine having a pair of welding electrodes, the upper one of which can be powered by an electric motor down into approximation with the fixed lower electrode in the work space. The enclosure preferably is a hollow tube disposed around the movable electrode and depending into the work space to a position above the lower electrode less than the thickness of a finger so that the work piece can be introduced into the work space but a finger cannot be inserted into the work space without raising the tube and interrupting the electrical circuit to the motor, thus preventing movement of the movable electrode. Specifically, an electrical contact is disposed on a surface of an upper flange by which the tube depends from a bracket. The bracket bears a pair of spaced leads bridged by the contact to complete an electrical circuit with the motor. If a finger pushes the tube up, the contact is moved out of bridging engagement with the leads, the circuit is broken and the motor ceases to move the movable electrode down towards the fixed electrode, thus preventing crushing of the fingers in the work space. Further features of the present invention are set forth in the following description and accompanying drawings.

DRAWINGS

DETAILED DESCRIPTION

Figure 1:
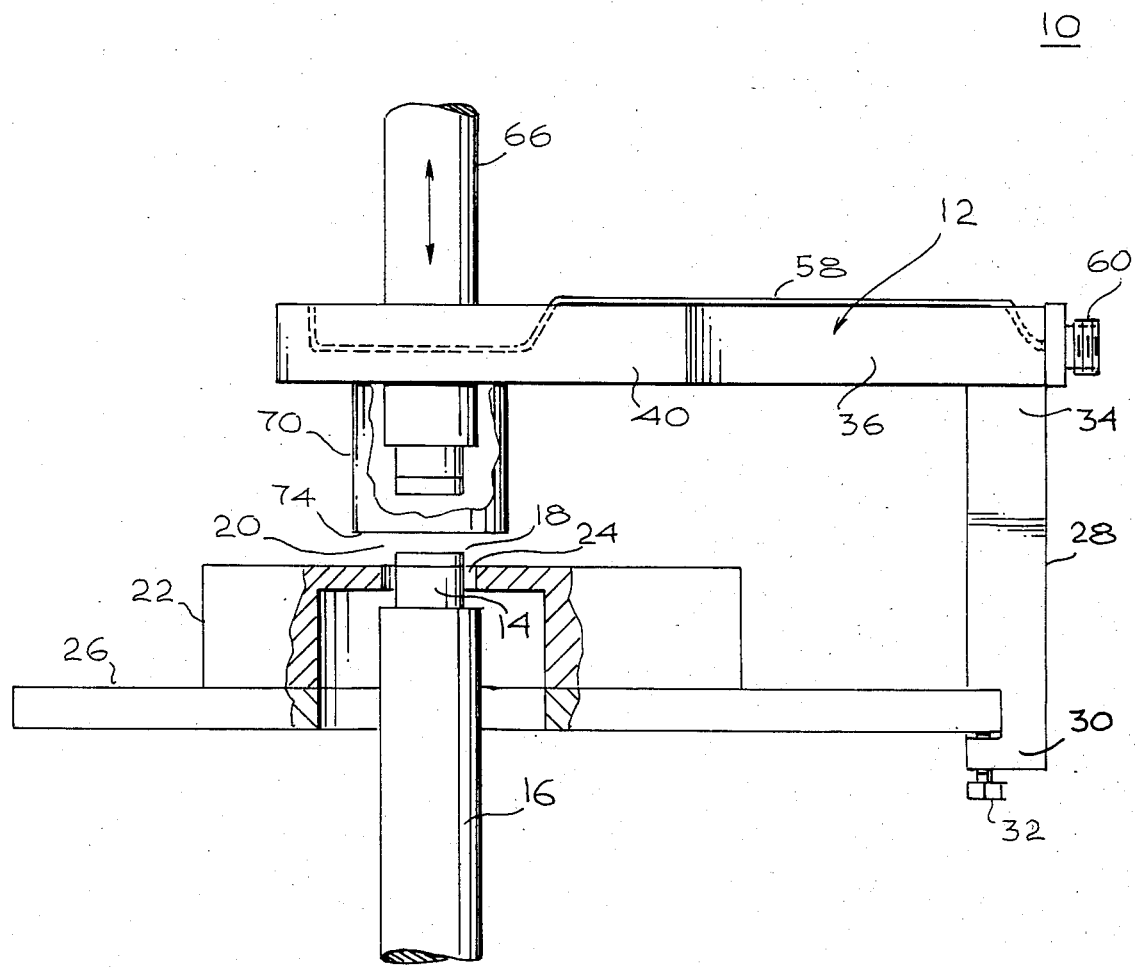
FIG. 1 is a schematic, fragmentary side elevation, partly broken away, of a preferred embodiment of the improved machine of the present invention bearing an automatic finger safety guard.
Figure 3:
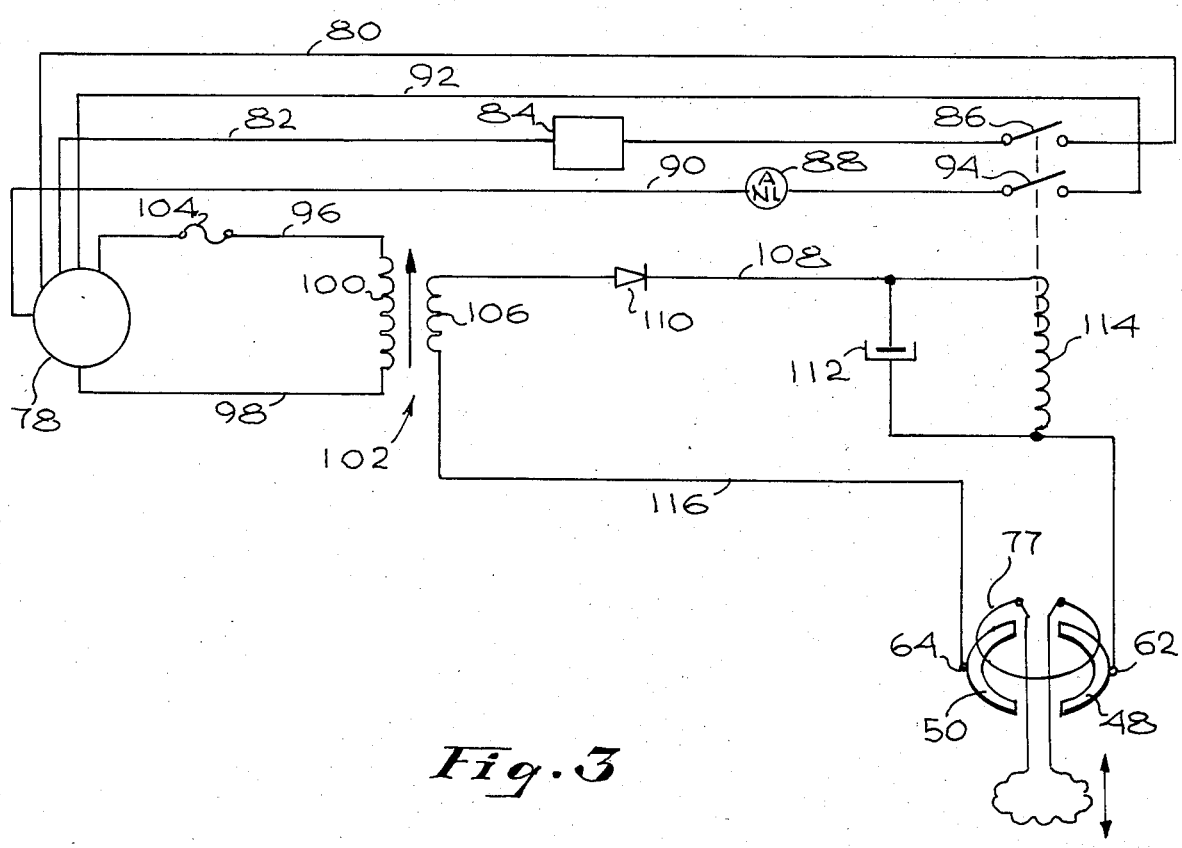

FIGS. 1 and 3

Now referring more particularly to FIG. 1 of the accompanying drawings, a preferred embodiment of the improved machine of the present invention having an automatic finger safety guard is schematically depicted therein. Thus, machine 10 is shown which comprises a typical resistance type welding assembly having a machine body 12 which incorporates a vertically oriented lower electrode 14 fixedly disposed in a holder 16, with the upper surface 18 of electrode 14 within work space 20 in machine 10. Work space 20 is also in part bordered by a horizontal work block 22 having an opening 24 up through which electrode 16 extends, as shown in FIG. 1.

Figure 2:
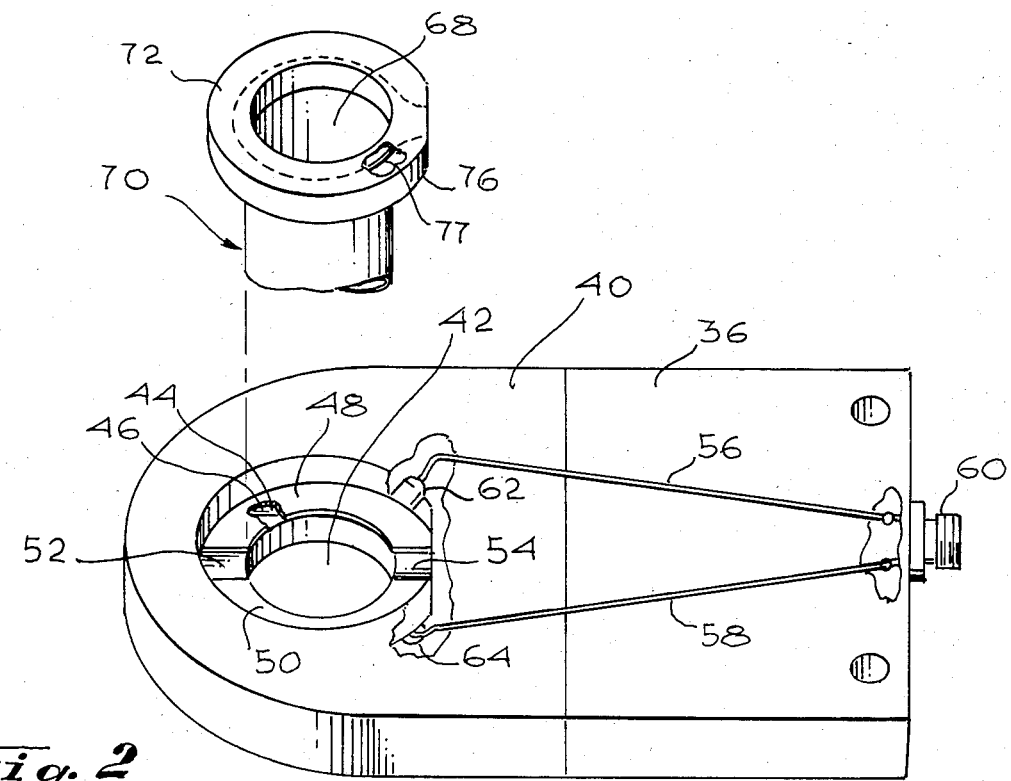
FIG. 2 is an enlarged schematic perspective view of the automatic finger safety guard of FIG. 1, including a bracket and upper portion of a hollow tube bearing switching means; and, FIG. 3 is a schematic circuit diagram illustrating a preferred embodiment of certain circuitry used in the improved machine of FIG. 2.

Work block 22 is secured to the upper surface of a work table 26. A vertically oriented mounting adapter 28 is secured adjacent its lower end 20, as by a threaded screw 32 to one end of table 26. The upper end 34 of adapter 28 is, in turn, secured to a horizontally extending adapter block 36 bearing at its free end 28, a support block 40 having a central circular vertical opening 42 therein (FIG. 2) and a recessed shelf 44 surrounding opening 42. The upper surface 46 of shelf 44 is provided with two curved thin electrically conductive plates 48 and 50 of copper, silver or the like. Plates 48 and 50 are separated by spaces 52 and 54. Electrically conductive leads 56 and 58 extend from a connector 60 through and over blocks 36 and 40, exiting block 40 at two spaced locations along shelf 44, where leads 56 and 58 connect to spaced contacts 62 and 64. Those contacts in turn electrically connect to plates 48 and 50, respectively.

Machine 10 is also provided with a vertically oriented movable electrode 66 spaced above and aligned with electrode 14. Electrode 66 is connected to means powered by an electric motor (not shown) for movement of electrode 66 downwardly towards electrode 14 during operation of the electric motor. The electric motor can be turned on by a conventional switch (not shown) when it is desired to operate motor 10. Electrode 66 passes down through an opening 68 in a hollow tube 70 bearing an upper horizontally extending flange 72. Flange 72 is dimensioned to seat on shelf 44. When flange 72 is so seated, tube 70 extends down toward upper surface 18 of electrode 14 such that the lower end 74 of tube 70 is less than the thickness of a finger above surface 18. However, tube 70 with attached flange 72 is readily upwardly displaceable by a finger entering work space 20. The undersurface 76 of flange 72 bears an electrically conductive lead or contact 77 of extended length which bridges space 52. Therefore, when surface 76 is in contact with plates 48 and 50, the circuit between leads 56 and 58 is completed. However, upward finger displacement of tube 70 results in movement of flange 72 and its surface 76 up out of contact with plates 48 and 50, interrupting such circuit.

FIG. 3 is a circuit diagram of the described circuit. A source of alternating current 79 is shown connected through leads 80 and 82 to a motor 84, with a switch 86 disposed in line 82. A light 88 (117 volt alternating current neon lamp) is connected by leads 90 and 92 to source 79, with a switch 94 disposed in line 92. Source 79 is also connected by lines 96 and 98 to a primary coil 100 (117 volt alternating current) of a transformer 102, with a fuse 104 disposed in line 96. A secondary coil 106 (12 volt direct current) forms with primary coil 100 the transformer 102. The secondary coil 106 is connected by line 108 to a diode 110, a capacitor 112 and a relay coil 114, as shown in the circuit diagram. Line 108 terminates at contact 62. Coil 106 is also connected to a line 116 which terminates at contact 64.

As shown in the circuit diagram of FIG. 3, contacts 48 and 50 are separated and it is necessary to move contact 77 down to bridge contacts 48 and 50 in order to complete the circuit between lines 108 and 116. (Lines 108 and 116 correspond to leads 58 and 46, respectively, of FIG. 2). When energized, both switch 86 and switch 94 are closed. Relay 114 is only energized when contacts 48 and 50 are bridged by contact 77 and direct current from transformer 102 is allowed to pass therethrough. When switch 86 is closed, motor 84 can be energized to cause electrode 66 to descend toward work space 20. Warning lamp 88 is also lighted because switch 94 is closed. When the circuit between contacts 48, 50 and 77 is broken, however, as by inserting a finger in work space 20 and lifting tube 70 upwardly, biased switches 86 and 94 move to the open position shown in FIG. 3 so that motor 84 is inactivated and light 88 goes out. Such inactivation continues until the finger is removed from the work space 20 and tube 70 is allowed to drop down, so that the circuit between contacts 48, 50 and 77 is again completed. Thus, it will be seen that automatic stopping of motor 84 is provided whenever a finger is introduced into work space 20. Preferably, a mechanism (not shown) for automatic retraction of electrode 66 upwardly out of work space 20 when motor 84 is inactivated, is also provided.

Accordingly, the improved device of the present invention provides increased safety for the operation of movable machine components in finger accessible work spaces. Various modifications, changes, alterations and additions to the machine of the present invention, the safety components thereof and their manner of interconnection can be made. All such modifications, changes, alterations and additions are within the scope of the appended claims and form part of the invention.

What is claimed is:

1. An improved resistance welding machine with automatic finger safety guard, said machine comprising, in combination:
   a. a resistance welding machine body defining a finger-accessible work space defined between a pair of welding electrodes with at least one of said electrodes being vertically disposed and movable in said work space; and,
   b. an electric motor connected by leads to a power source and to said movable electrode for powering said movable electrode; and,
   c. an automatic finger safety guard secured to said machine body and comprising:
      i. a finger-movable enclosure comprising a hollow tubular body vertically disposed around said movable electrode, the upper end of said hollow tubular body including an outwardly extending flange, and said guard including a bracket upon which said flange is disposed and from which said hollow tubular body depends; and,
      ii. switch means connected to said hollow tubular body and to said electric motor leads for automatically interrupting said powering of said movable electrode upon movement of said enclosure.

2. The improved machine of claim 1 wherein said switch means includes a pair of spaced leads extending through said bracket and terminating adjacent said flange, and wherein said flange includes an electrically conductive contact bridging said lead terminals to complete an electrical circuit only when said hollow tubular body is in the operative protective fully depending position around said work space.

3. The improved machine of claim 2 wherein upward movement of said hollow tubular body from said fully depending position moves said flange bridging material away from said lead terminals, thereby interrupting current flow through said leads.

4. The improved machine of claim 3 wherein said vertical movable upper electrode is directly above a second fixed lower vertical electrode and wherein the work space between the lower end of said hollow tubular body in its fully depending position and the upper surface of said lower electrode is less than the thickness of a finger, whereby introduction of a finger into said work space automatically lifts said hollow tubular body and breaks said circuit so as to automatically terminate movement of said upper movable electrode down toward said fixed electrode.

* * * * *